Figure 1:
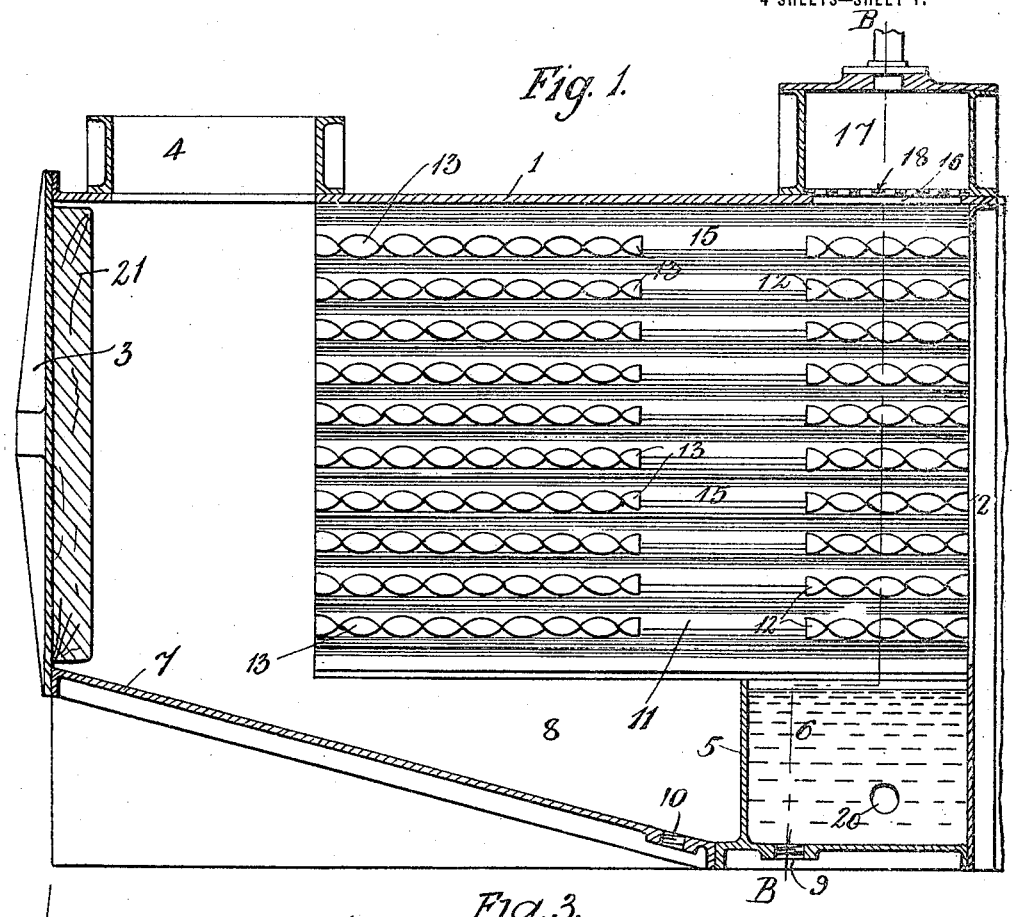

W. H. YARDLEY.
APPARATUS FOR TREATING AIR OR OTHER GASES.
APPLICATION FILED MAR. 20, 1918.

1,323,666.

Patented Dec. 2, 1919.
4 SHEETS—SHEET 1.

William Henry Yardley
By Davis & Davis
Attys

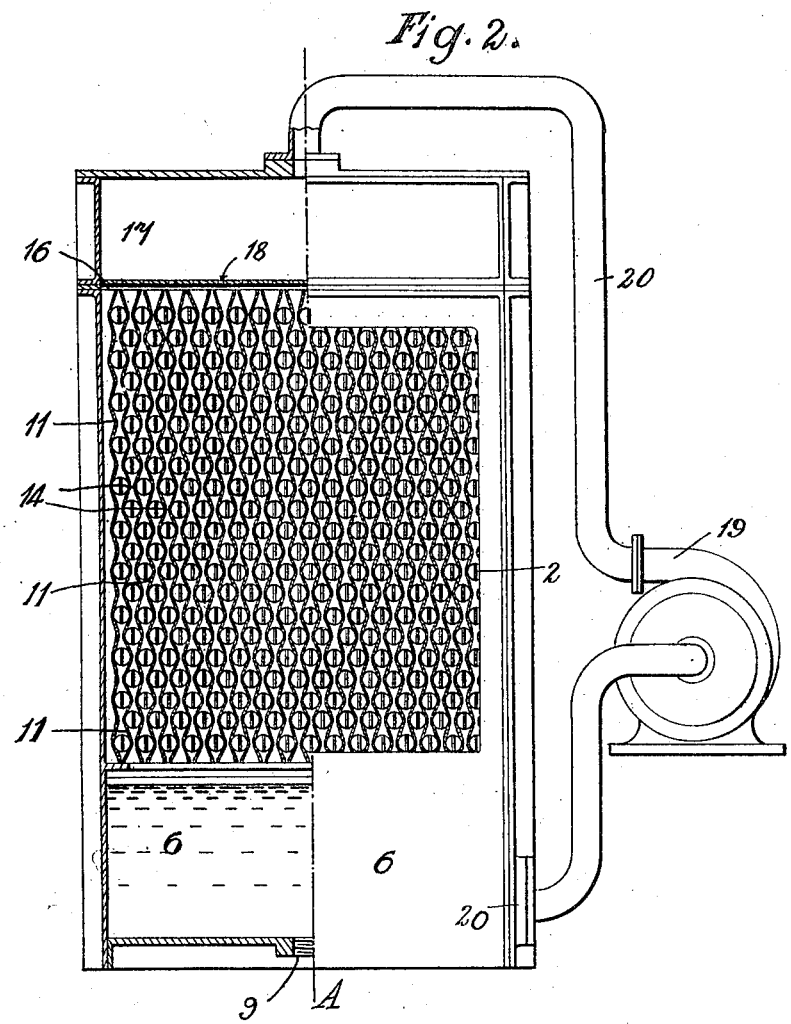

W. H. YARDLEY.
APPARATUS FOR TREATING AIR OR OTHER GASES.
APPLICATION FILED MAR. 20, 1918.

1,323,666.

Patented Dec. 2, 1919.
4 SHEETS—SHEET 3.

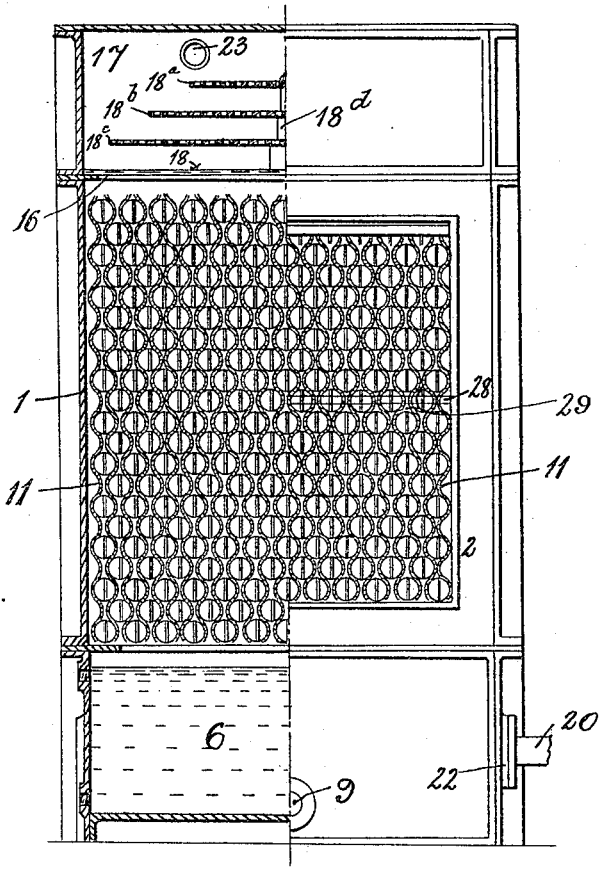
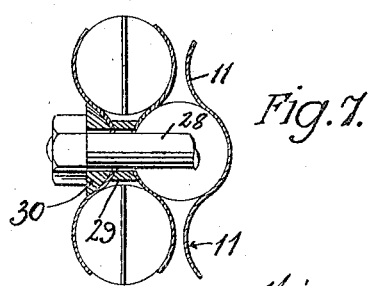

UNITED STATES PATENT OFFICE.

WILLIAM HENRY YARDLEY, OF SHEFFIELD, ENGLAND.

APPARATUS FOR TREATING AIR OR OTHER GASES.

1,323,666.  Specification of Letters Patent.  Patented Dec. 2, 1919.

Application filed March 20, 1918. Serial No. 223,653.

*To all whom it may concern:*

Be it known that I, WILLIAM HENRY YARDLEY, a subject of the King of Great Britain and Ireland, residing at Sheffield, in the county of York, England, have invented Improvements in or Relating to Apparatus for Treating Air or other Gases, of which the following is a specification.

This invention has reference to that class of apparatus suitable for purifying or otherwise conditioning air or other gases, and for other purposes, wherein plates, flat or corrugated, have been arranged near together to form between them passages through which the air or gases to be treated is or are caused to flow, films of water being at the same time caused to flow over the surfaces of the adjacent plates.

The present invention has for its object to provide apparatus of this class of simple construction whereby air or other gases (hereinafter included in the term air) and water or other liquid (hereinafter included in the term water) can be more readily brought into intimate contact with each other for the purpose of, for instance, purifying, cooling or otherwise conditioning or treating the air, than heretofore.

For this purpose apparatus according to the invention is constructed with guiding means over which films, layers or sheets of water are caused to fall and between which the air to be treated is caused to flow, and with means arranged between and parallel to the guiding means whereby the air in its forward movements is continually or repeatedly deflected outwardly or laterally so as to be brought into effective contact with the falling films, layers or sheets of water (hereinafter referred to as sheets of water) so that dust or other particles of solid matter in the air, or soluble gases or other impurities therein, will be arrested or absorbed by the sheets of water and the air thus purified, the purified air flowing onward for use and the water with dust or other particles or impurities therein flowing downward, it may be into a receptacle for further use or subsequent treatment, or into a waste pipe or conduit or other place, as may be desired.

The guiding means for the sheets of water may advantageously be formed by vertically arranged plates or divisions spaced a short distance apart. The outward deflecting movement of the streams of air may advantageously be produced by causing the streams of air to flow along helical or equivalent paths arranged between and parallel to the surfaces over which the water is caused to descend, the rotary outward or lateral motion of the streams of air, caused by their flowing along helical or equivalent paths, serving to bring them into effective contact with the downwardly moving sheets of water.

When it is desired that the purified air should be freed, as far as possible, from any moisture taken up from the sheets of water, it may be passed through additional means or apparatus adapted to effect separation of moisture therefrom. Such additional means or apparatus, which may be called for distinction a separator, may advantageously be similar in construction to the apparatus used for removing the dust and other impurities from the air but in which there are no flowing sheets of water, the purified but moistened streams of air being, in this case, wholly or in part, caused by outward deflection thereof, produced by flowing in helical or equivalent paths, to come into effective contact with downwardly extending surfaces that will catch and separate moisture from the streams of air.

Between the dust and moisture separating devices or portions of the apparatus may be a space or spaces through which the streams of air can pass, it may be in an expanded condition and at a slower velocity, without being constrained to flow in helical or like paths. If desired, the streams of air may be brought into contact with moisture absorbing material either by causing it to impinge thereon or to pass therethrough, before being conducted away for use.

Apparatus embodying the invention can be constructed in various forms.

Conveniently the vertically arranged plates or divisions may be formed by galvanized corrugated metal sheets arranged at a short distance apart with their corrugations horizontal and with the hollows and crests of one sheet opposite the hollows and crests respectively of the adjacent sheets. The means used for imparting a rotary or helical motion to the streams of air flowing between the sheets may conveniently consist of a number of galvanized metal strips or blades each twisted to a helical shape and clamped between the corrugated metal sheets; the twisted blades being located in and between the hollows of the sheets, the diameter of the helical or twisted air guiding and deflecting devices being such that the opposed crests of the corrugated sheets will be spaced a short distance apart. The air to be treated may be caused to flow between the sheets by any suitable means, such as a fan.

Figure 3:
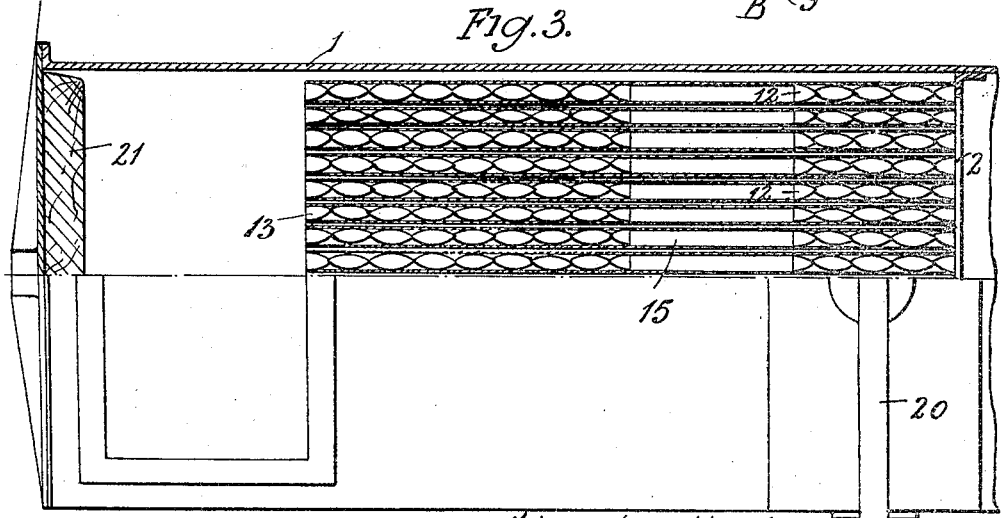

In the accompanying drawings, Figure 1 is a longitudinal section on the line A A of Fig. 2, Fig. 2 a view partly in end elevation and partly in cross section on the line B B of Fig. 1, and Fig. 3 a view partly in plan and partly in horizontal section, showing one construction of apparatus according to the invention, adapted for removing dust from air by flowing sheets of water and for removing moisture from the purified air.

Figure 4:
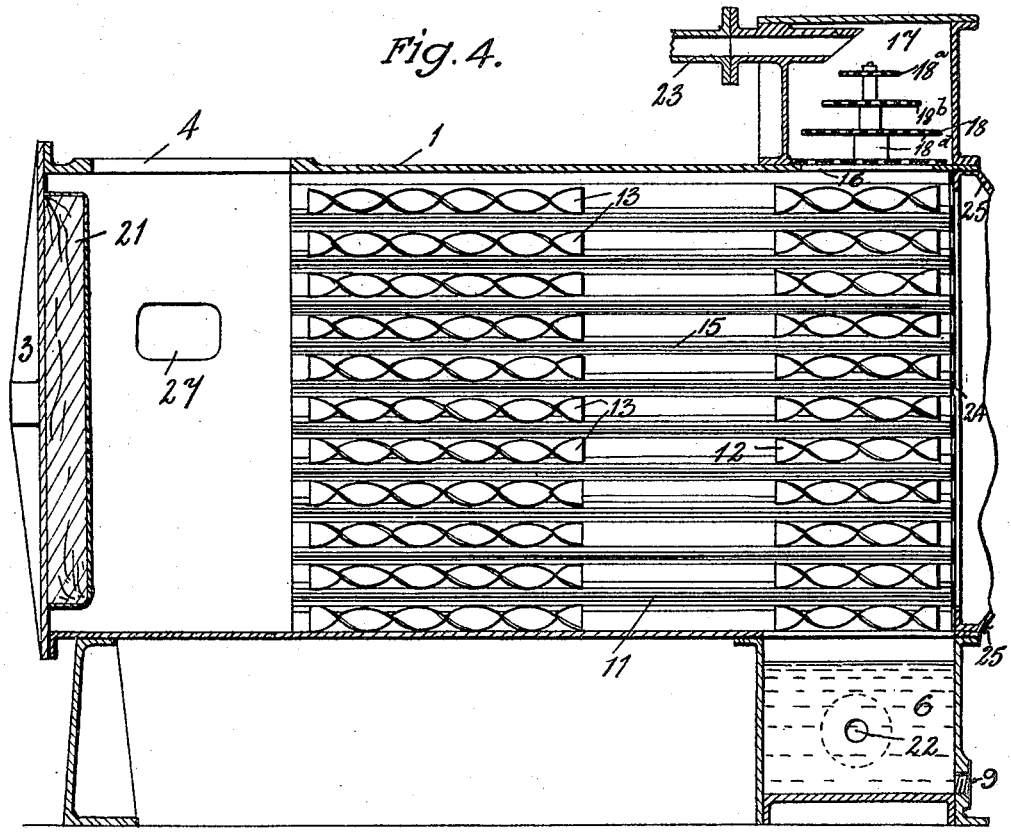
Figure 6:
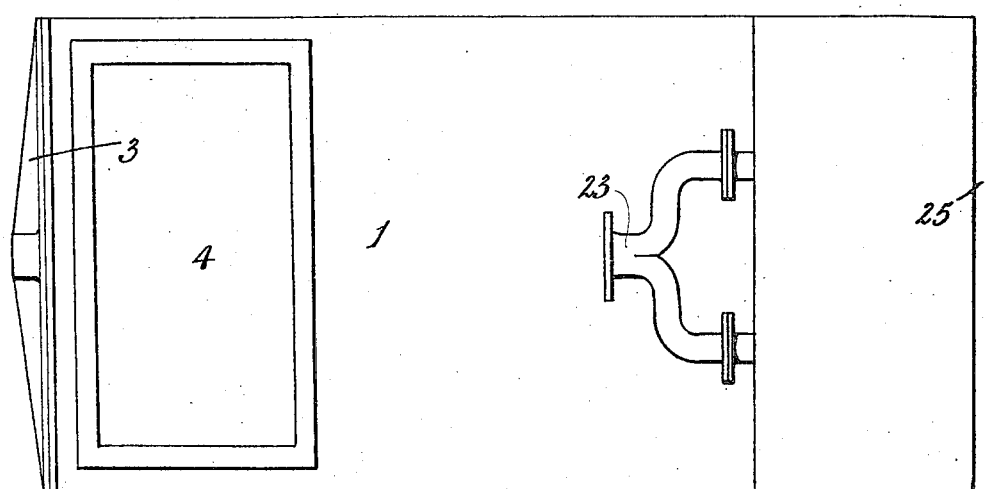

Figs. 4 and 5 are similar views to Figs. 1 and 2 respectively and Fig. 6 a plan, showing a modified construction. Fig. 7 is a detail view.

The example of apparatus shown in Figs. 1, 2 and 3 comprises a casing 1 having a large inlet 2 at one end for the air to be treated, a removable door 3 at the other end and an outlet 4 for purified air at the top adjacent to the door. The lower part of the casing 1 at the air inlet end is adapted by means of a vertical transverse partition 5 to form a receptacle 6 for liquid. The floor 7 of the remaining portion of the lower part of the casing may, as shown, be inclined downwardly toward the receptacle 6 to form a second receptacle or sump 8. The receptacles 6 and 8 are formed with outlets 9, 10 respectively for connection to draw-off pipes or valves (not shown). Within the casing 1 and above the transverse partition 5 there are disposed a large number of longitudinally extending corrugated metal sheets 11 arranged vertically with their corrugations horizontal as hereinbefore described. Such sheets 11 may extend from the inlet end to the outlet end of the casing. Between the sheets 11 are arranged two series or batteries of metal blades 12, 13 respectively, each having been twisted to a helical shape, as hereinbefore described, to form an air deflector, the blades being held firmly in place by suitably clamping the metal sheets 11 together. The helical deflectors 12, 13 may, for example, each be of about one and a half inches diameter and the opposed crests of metal sheets may be arranged about three sixteenths of an inch apart, as at 14. One series or battery of these deflectors, consisting of the blades 12, and hereinafter called for distinction the wet battery, is arranged over the liquid receptacle 6 at the bottom of the casing. The other series of deflectors, consisting of the blades 13 and hereinafter called for distinction the dry battery, which may be longer than the first mentioned series, is arranged in front of the wet battery and displaced forwardly therefrom so as to leave between the two and the corrugated metal sheets, free airways 15 in which the air, after flowing through the wet battery, can expand to some extent before flowing through the dry battery. Above an opening 16 at the top of the casing and above the wet battery, is arranged a water chamber 17 having at its bottom a water distributing device, such as a perforated water distributing plate 18, and into which water is delivered by a pump 19. This pump, as diagrammatically indicated in Fig. 3, may be inserted in the circuit of a water circulating pipe 20 that may draw its supply of water from the water receptacle 6 below the wet battery.

The arrangement is such that upon delivering water into the chamber 17, it will be distributed through the plate 18 over the metal sheets 11 from which it will fall in the form of thin sheets, and air caused to simultaneously flow through the casing from the inlet 2 will be divided up into a number of streams that will be continually deflected by the helical deflectors 12 outward against the falling sheets of water which will remove dust and other impurities from the air and carry them down into the water receptacle 6 at the bottom. The purified and moistened air will then flow onward through the free airways 15 between the sheets 11 and batteries and then through the dry battery where moisture will be removed from it by the sheets, the moisture draining down the sheets and falling into the second receptacle or sump 8 and the dry air passing away through the air outlet 4.

To the inner side of the door 3 may be secured a layer or pad 21 of absorbent material, such for example as loose asbestos or felt, with which the air will come into contact and which will serve to further eliminate any remaining moisture therein.

The modified arrangement illustrated in Figs. 4, 5 and 6 has a general resemblance to that already described with reference to Figs. 1, 2 and 3, and corresponding parts of the two arrangements are indicated by the same reference characters. In the latter arrangement, shown in Figs. 4, 5, 6 and 7, however, the sump 8 of Figs. 1, 2 and 3 is dispensed with, while the water-circulating pipe 20 is provided at its inlet end, within the water receptacle 6, with a strainer 22, and at its outlet end with a double-branched connection 23 with the chamber 17, while between the water-distributing plate 18 and the outlets of the branched pipe 23 there is interposed a series of auxiliary distributing plates $18^a$, $18^b$, $18^c$, supported on a stepped support $18^d$ and of successively increasing dimensions in the downward direction. The pumping device 19 is not shown, and only the terminal portions of the water-circulating pipe 20 are indicated, the arrangement being otherwise analogous to that of Fig. 3. The air inlet 2 is fitted with a perforated inlet plate surrounded by an inclined protecting flange 25. The side of the receptacle 6 opposite to the strainer 22 is or may be provided with a large handhole for cleaning purposes, fitted with a cover. A handhole 27 fitted with a cover 28 is also provided in the wall of the casing 1 below the uptake 4, to facilitate testing of the condition of the air that has passed through the apparatus.

In each case the group of metal sheets 11 may, as shown in Fig. 7, advantageously be connected together to form a single unit by transversely arranged stay-bolts 28 carrying metal dividing or spacing washers 29 fitted between the corrugated sheets 11, and convex terminal washers 30 whose convexity conforms the concavity of the corrugations.

Apparatus constructed and adapted to operate as described can advantageously be used for purifying air to be supplied to electric dynamos and like electrical apparatus and for cooling and ventilating purposes. It can also be used for other purposes, as for instance purifying liquid, or for producing a mixture of air and steam, or for purifying air in connection with air compressors.

What I claim is:—

1. Apparatus of the kind herein referred to, comprising a group of metal sheets arranged with a space between adjacent sheets so as to form passages along which liquid can move in films, each sheet, except the outermost ones, forming the wall of two adjacent passages, and means between adjacent sheets arranged transversely to the passages and making contact with such plates at intervals, the said means repeatedly deflecting gas laterally in a general forward movement across the passages aforesaid, substantially as set forth.

2. Apparatus of the kind herein referred to, comprising a group of metal sheets arranged vertically with a space between adjacent sheets so as to form passages along which liquid can move in films, each sheet, except the outermost ones, forming the wall of two adjacent passages, and means arranged substantially vertically between adjacent sheets and making contact with such sheets at intervals, the said means repeatedly deflecting gas laterally in a general forward movement across the passages aforesaid, substantially as set forth.

3. Apparatus of the kind herein referred to, comprising a group of metal corrugated sheets having the hollows and crests of one sheet opposite the hollows and crests of adjacent sheets and means arranged longitudinally within the hollows of adjacent plates and in contact with both such sheets at intervals in the lengths of the hollows, the whole constituting a unit having passages along which liquid can move in films and across which gas can move with a periodic lateral deflection, substantially as set forth.

4. Apparatus of the kind herein referred to comprising a group of metal corrugated sheets having their corrugations disposed horizontally with the hollows and crests of one sheet opposite the hollows and crests of adjacent sheets and means arranged longitudinally within the hollows of adjacent sheets and in contact with both such sheets at intervals in the length of the hollows, the whole constituting a unit having passages down which liquid can move in films and across which gas can move with a periodic lateral deflection, substantially as set forth.

5. Apparatus of the kind herein referred to, comprising corrugated metal sheets arranged vertically at a short distance apart with their corrugations horizontal and with the hollows and crests of one sheet opposite the hollows and crests respectively of the adjacent sheet or sheets and means adapted to impart a rotary or helical motion to streams of gas between the sheets, said means consisting of a number of metal strips each twisted to a helical shape and arranged between the corrugated metal sheets, the twisted blades being located in and between the hollows of the sheets, and the diameter of the helical gas guiding devices being such that the opposed crests of the corrugated sheets will be spaced a short distance apart, substantially as set forth.

6. For use in apparatus of the kind herein referred to, a group of metal corrugated sheets having their corrugations disposed horizontally with the hollows and crests of one sheet opposite the hollows and crests of adjacent sheets, helically twisted metal blades arranged longitudinally within the hollows of adjacent plates and means securing the plates and blades together to form a unit.

7. For use in apparatus of the kind herein referred to, a group of metal corrugated sheets having their corrugations disposed horizontally with the hollows and crests of one sheet opposite the hollows and crests of adjacent sheets, helically twisted metal blades arranged longitudinally within the hollows of adjacent plates along different portions of the length of the hollows so as to leave a free space between the adjacent ends of the blades and means securing the plates and blades together to form a unit.

8. Apparatus of the kind herein referred to, comprising a casing having at one end an inlet for air to be treated and at its other end an outlet for treated air, vertically disposed corrugated metal plates arranged longitudinally in said casing, said plates having their corrugations disposed horizontally with the hollows and crests of the several plates opposite one another, helically twisted metal blades arranged longitudinally in the juxtaposed hollows of adjacent plates, means for securing the plates and strips or blades together and means for distributing water over the surfaces of the plates.

9. Apparatus of the kind herein referred to comprising a casing having at one end an inlet for air to be treated and at its other end an outlet for treated air, vertically disposed corrugated metal plates arranged longitudinally in said casing, said plates having their corrugations disposed horizontally with the hollows and crests of the several plates opposite one another, helically twisted metal blades arranged longitudinally in the juxtaposed hollows of adjacent plates, means for securing the plates and strips or blades together at the rearward portions of such hollows and additional helical metal strips or blades similarly arranged in the forward portions of the juxtaposed hollows so as to form two groups of helical strips spaced apart from each other longitudinally, means for securing the plates and strips together, and means for delivering water over the portions of the surfaces of the plates between which the rearward group of helical blades are secured.

10. Apparatus of the kind herein referred to, comprising a casing having at one end an inlet for air to be treated and at its other end an outlet for treated air, vertically disposed corrugated metal plates arranged longitudinally in said casing, said plates having their corrugations disposed horizontally with the hollows and crests of the several plates opposite one another, helically twisted metal blades arranged longitudinally in the juxtaposed hollows of adjacent plates, means for securing the plates and strips or blades together, means for distributing water over a portion, lengthwise, of the plates, a tank arranged within the casing and below the portion of the plates over which water is distributed and means for circulating water between the tank and the water distributing means.

11. Apparatus of the kind herein referred to, comprising a casing having at one end an inlet for air to be treated and at its other end an outlet for treated air, vertically disposed corrugated metal plates arranged longitudinally in said casing, said plates having their corrugations disposed horizontally, with the hollows and crests of the several plates opposite one another, helically twisted metal blades arranged longitudinally in the juxtaposed hollows of adjacent plates, means for securing the plates and strips or blades together, means for distributing water over the surfaces of the plates, and moisture absorbing means arranged beyond the plates and against which the treated air can impinge or flow on its way to the outlet of the casing.

12. Apparatus of the kind herein referred to comprising a group of metal sheets arranged with a space between the adjacent sheets so as to form separate passages along which fluid can move, each sheet, except the outermost ones, forming the wall of two adjacent passages, and means between adjacent plates arranged in separated sets transversely to the passages the said means enabling a gas to be repeatedly deflected laterally at different separated regions in the length of the passages, substantially as set forth.

13. Apparatus of the kind herein referred to, comprising a group of rectangular metal sheets arranged at a short distance apart so as to form between them narrow spaces open at each edge of the group and between which different fluids can flow in directions at right angles to one another and guiding and deflecting means arranged between the sheets adapted to impart a combined helical forward and radial outward motion to fluids flowing through the spaces and in contact with said guiding and deflecting means.

14. Apparatus of the kind herein referred to, comprising a group of rectangular metal sheets arranged at a short distance apart so as to form between them narrow spaces open at opposite edges of the group, adjacent sheets being shaped so that longitudinal portions of their adjacent surfaces are nearer together than other and adjacent longitudinal portions and helically shaped bodies arranged between those longitudinal portions of the surfaces of the sheet that are farthest apart.

Signed at Sheffield, England, this twentieth day of February, 1918.

WILLIAM HENRY YARDLEY.